(12) United States Patent
Figueroa et al.

(10) Patent No.: US 8,520,345 B2
(45) Date of Patent: Aug. 27, 2013

(54) PROTECTION CIRCUIT APPLIED TO WIND POWER GENERATION SYSTEM EMPLOYING DOUBLE-FED INDUCTION GENERATOR

(75) Inventors: Ruben Alexis Inzunza Figueroa, Tokyo (JP); Junichi Nomura, Tokyo (JP); Manabu Souda, Tokyo (JP)

(73) Assignee: Toshiba Mitsubishi-Electric Industrial Systems Corporation, Tokyo (JP)

( * ) Notice: Subject to any disclaimer, the term of this patent is extended or adjusted under 35 U.S.C. 154(b) by 0 days.

(21) Appl. No.: 13/181,817

(22) Filed: Jul. 13, 2011

(65) Prior Publication Data

US 2011/0266800 A1 Nov. 3, 2011

Related U.S. Application Data

(63) Continuation of application No. PCT/JP2009/050373, filed on Jan. 14, 2009.

(51) Int. Cl.
*H02H 7/00* (2006.01)
*H02J 3/00* (2006.01)
*F03D 9/00* (2006.01)

(52) U.S. Cl.
USPC ................................. 361/18; 307/69; 290/44

(58) Field of Classification Search
USPC ................................. 361/18; 307/69; 290/44
See application file for complete search history.

(56) References Cited

U.S. PATENT DOCUMENTS

| 6,566,764 | B2 * | 5/2003 | Rebsdorf et al. ................. 290/44 |
| 2002/0166073 | A1 * | 11/2002 | Nguyen et al. ................. 713/300 |
| 2006/0163881 | A1 * | 7/2006 | Bucker et al. ................... 290/44 |
| 2006/0192390 | A1 * | 8/2006 | Juanarena Saragueta et al. .............................. 290/44 |
| 2007/0210651 | A1 | 9/2007 | Ichinose et al. |

FOREIGN PATENT DOCUMENTS

| JP | 3-256597 | 11/1991 |
| JP | 2006-230085 | 8/2006 |
| JP | 2007-244136 | 9/2007 |
| WO | WO 2004/008627 A1 | 1/2004 |

OTHER PUBLICATIONS

International Search Report from the Japanese Patent Office in International Application No. PCT/JP2009/050373 mailed Mar. 17, 2009.
International Preliminary Report on Patentability and Written Opinion issued by the International Bureau of WIPO on Aug. 16, 2011, for International Patent Application No. PCT/JP2009/050373.

* cited by examiner

*Primary Examiner* — Scott Bauer
(74) *Attorney, Agent, or Firm* — Finnegan, Henderson, Farabow, Garrett & Dunner, LLP

(57) ABSTRACT

There is provided a protection circuit that protects a power converter connected to a secondary winding of a double-fed induction generator, the protection circuit including a rectifying unit connected to the secondary winding and configured to rectify an electric power coming through the secondary winding, a power consumption unit configured to consume the electric power rectified by the rectifying unit, and a switching unit connected to the power consumption unit in series and configured to switch to adjust the electric power flowing into the power consumption unit.

33 Claims, 3 Drawing Sheets

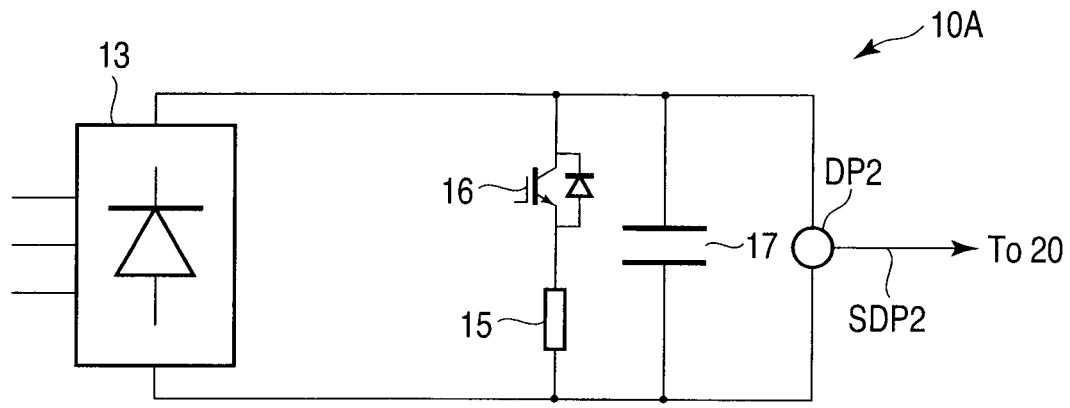
F I G. 4
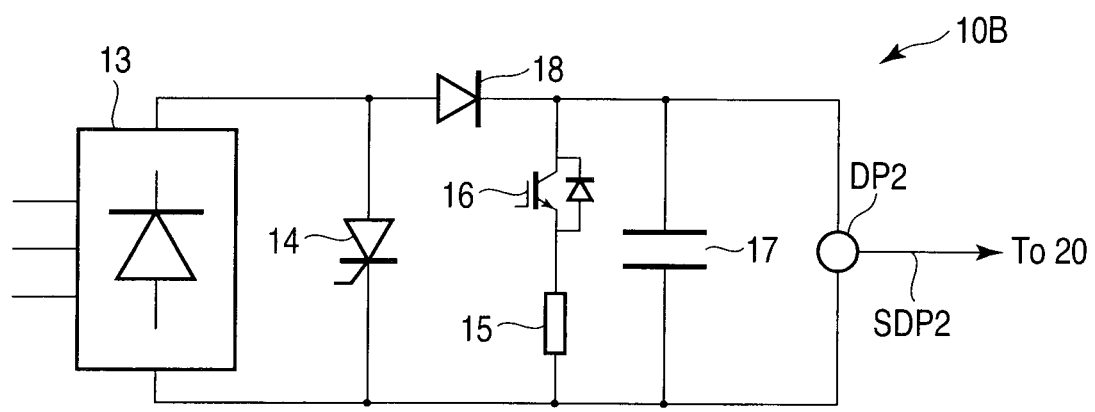
F I G. 5

PROTECTION CIRCUIT APPLIED TO WIND POWER GENERATION SYSTEM EMPLOYING DOUBLE-FED INDUCTION GENERATOR

CROSS-REFERENCE TO RELATED APPLICATIONS

This application is a Continuation Application of PCT Application No. PCT/JP2009/050373, filed Jan. 14, 2009, the entire contents of which are incorporated herein by reference.

BACKGROUND OF THE INVENTION

1. Field of the Invention

The present invention relates to a protection circuit applied to wind power generation system employing a double-fed induction generator.

2. Description of the Related Art

In general, a wind power generation system sometimes utilizes a double-fed induction generator. The double-fed induction generator includes a stator and a rotor. The stator is directly connected to a grid (an electric power system). The rotor is connected to a converter (an electric power converter) which excites the rotor. This rotor is rotated by wind force. According to such a configuration, the wind power generation system generates an electric power by the wind force and supplies the electric power to the grid.

In this wind power generation system, a grid voltage lowers sometimes when a grid fault occurs. When the grid voltage lowers, an overcurrent flows from the rotor into the converter. Furthermore, when the rotor is excessively speeded up by a wind gust, a voltage on the side of the rotor rises, so that the overcurrent flows from the rotor into the converter. Such a current brings about the overcurrent or overvoltage of the converter.

Thus, for protecting the converter from such an overcurrent, it is known that a protection circuit is provided in the wind power generation system (see e.g. Jpn. Pat. Appln. KOKAI Publication No. 2006-230085).

However, for continuously performing ride through of the wind power generation system upon such a grid fault (LVRT, low voltage ride through), as the protection circuit, a large-sized circuit is only known.

BRIEF SUMMARY OF THE INVENTION

An object of the present invention is to provide a protection circuit applied to a wind power generation system employing a double-fed induction generator, which enables the wind power generation system to continue to operate even if a power line system fails, and which is miniaturized.

According to an aspect of the present invention, there is provided a protection circuit that protects a power converter connected to a secondary winding of a double-fed induction generator, the protection circuit comprising: a rectifying unit connected to the secondary winding and configured to rectify an electric power coming through the secondary winding; a power consumption unit configured to consume the electric power rectified by the rectifying unit; and a switching unit connected to the power consumption unit in series and configured to switch to adjust the electric power flowing into the power consumption unit.

BRIEF DESCRIPTION OF THE SEVERAL VIEWS OF THE DRAWINGS

FIG. 4 is a block diagram showing a configuration of a protection circuit according to a second embodiment of the present invention; and FIG. 5 is a block diagram showing a configuration of a protection circuit according to a third embodiment of the present invention.

DETAILED DESCRIPTION OF THE INVENTION

Hereinafter, embodiments of the present invention will be described with reference to the drawings.

First Embodiment

Figure 1:
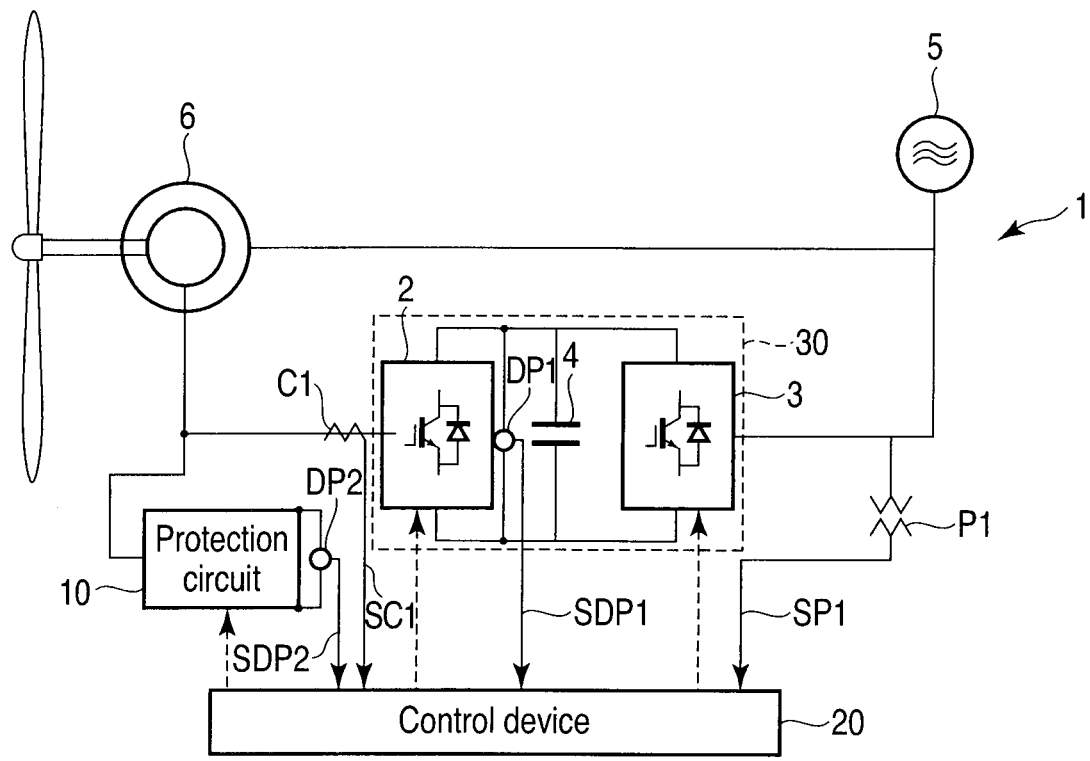
FIG. 1 is a block diagram showing a configuration of a wind power generation system according to a first embodiment of the present invention.

FIG. 1 is a block diagram showing a configuration of a wind power generation system 1 according to a first embodiment of the present invention. In the subsequent drawings, the same parts will be denoted with the same reference marks to omit the detailed descriptions thereof, and different parts will mainly be described. Similarly, in the subsequent embodiments, repeated descriptions will be omitted.

The wind power generation system 1 includes a double-fed induction generator 6, a grid 5, a protection circuit 10, a control device 20, a back to back (BTB) converter 30 (4-quadrant converters), an alternating current detector C1, and an alternating-current voltage detector P1.

The double-fed induction generator 6 includes a stator and a rotor. The rotor is rotated by wind.

The grid 5 is directly connected to a winding (a primary winding) on a stator side (a primary side) of the double-fed induction generator 6. The grid 5 is an alternating-current power system which receives the supply of an electric power generated by the double-fed induction generator 6.

The alternating current detector C1 detects an alternating current flowing through a path which connects a winding (a secondary winding) on a rotor side of the double-fed induction generator 6 (a secondary side) to the BTB converter 30. The alternating current detector C1 transmits a detected value as an alternating current signal SC1 to the control device 20.

The alternating-current voltage detector P1 detects an alternating-current voltage applied to a path which connects the BTB converter 30 to the grid 5. The alternating-current voltage detector P1 transmits a detected value as an alternating-current voltage signal SP1 to the control device 20.

The BTB converter 30 includes a rotor-side converter 2, a grid-side converter 3, a capacitor 4 and a direct-current voltage measuring unit DP1.

The rotor-side converter 2 and the grid-side converter 3 are connected to each other on direct-current sides thereof by a direct-current link. The rotor-side converter 2 is connected on the alternating current side thereof to the secondary winding of the double-fed induction generator 6. The grid-side converter 3 is connected on the alternating current side thereof to the grid 5.

The rotor-side converter 2 converts a direct-current power supplied through the direct-current link to an alternating-current power. The rotor-side converter 2 excites the secondary winding of the double-fed induction generator 6 by the converted alternating-current power.

The grid-side converter 3 converts the alternating-current power supplied from the grid 5 to the direct-current power. The grid-side converter 3 supplies the converted direct-current power to the direct-current link.

The capacitor 4 has two terminals connected to a positive electrode side and a negative electrode side of the direct-current link, respectively. The capacitor 4 smooths the direct-current power applied to the direct-current link. The capacitor 4 is charged with the direct-current power supplied through the direct-current link. The capacitor 4 discharges the charged energy through the direct-current link.

The direct-current voltage detector DP1 has two terminals for measurement, which are connected to the positive electrode side and the negative electrode side of the direct-current link, respectively. That is, the direct-current voltage detector DP1 is connected to both ends of the capacitor 4. The direct-current voltage detector DP1 detects the direct-current voltage applied to the direct-current link (both the ends of the capacitor 4). The direct-current voltage detector DP1 transmits a detected value as a direct-current voltage signal SDP1 to the control device 20.

The protection circuit 10 is connected to the secondary winding of the double-fed induction generator 6. The protection circuit 10 is a circuit for protecting the rotor-side converter 2 from an overcurrent which flows into the converter, when the voltage of the grid 5 lowers or when the rotor is excessively speeded up by a wind gust.

The control device 20 is a device which controls the wind power generation system 1. The control device 20 controls the protection circuit 10. Specifically, the control device 20 allows the protection circuit 10 to perform an operation for protecting the rotor-side converter 2 in response to a fault of the grid 5 occurring. In response to the grid 5 recovering from the fault, the control device 20 allows the protection circuit 10 to stop the operation for protecting the rotor-side converter 2.

Figure 2:
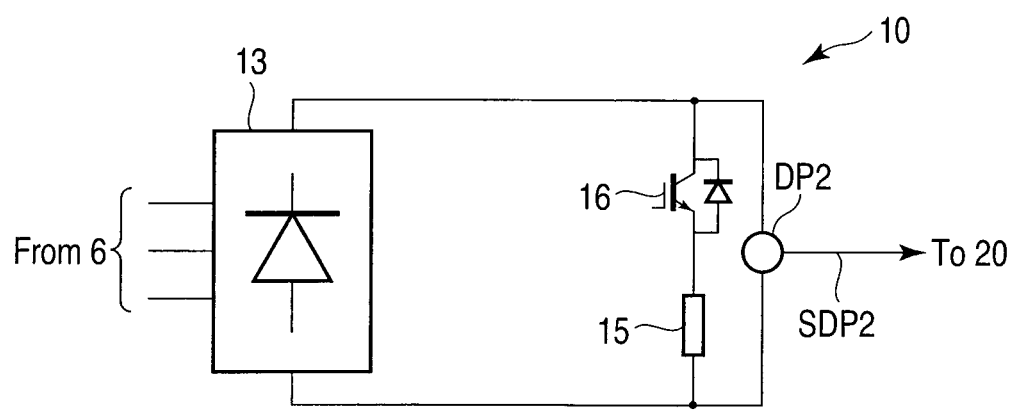
FIG. 2 is a circuit diagram showing a configuration of a protection circuit according to the first embodiment.

FIG. 2 is a circuit diagram showing a configuration of the protection circuit 10 according to the present embodiment.

The protection circuit 10 includes a diode rectifier 13, a switching element 16, a resistor 15, and a direct-current voltage detector DP2.

The switching element 16 and the resistor 15 are connected in series between both the terminals of the diode rectifier 13 on the direct-current side. That is, the diode rectifier 13, the switching element 16 and the resistor 15 constitute a closed circuit.

The alternating-current side of the diode rectifier 13 is connected to the secondary winding of the double-fed induction generator 6. The diode rectifier 13 rectifies the alternating current coming from the double-fed induction generator 6 into the direct current.

The switching element 16 is, for example, an insulated gate bipolar transistor (IGBT). The switching element 16 is connected to a free wheel diode in antiparallel. The switching element 16 is switched to adjust the current which flows through the resistor 15. The switching control of the switching element 16 is carried out by the control device 20.

The resistor 15 consumes the current coming through the switching element 16. In consequence, the resistor 15 consumes the direct-current power rectified by the diode rectifier 13. The resistor 15 consumes the current when the switching element 16 is in an on-state. When the switching element 16 is in an off-state, no current flows into the resistor 15, and hence the resistor 15 does not consume any power.

The direct-current voltage detector DP2 detects the voltage on the direct-current side of the diode rectifier 13 (the direct-current voltage of the protection circuit 10). The direct-current voltage detector DP2 transmits a detected value as a direct-current voltage detection SDP2 to the control device 20.

Figure 3:
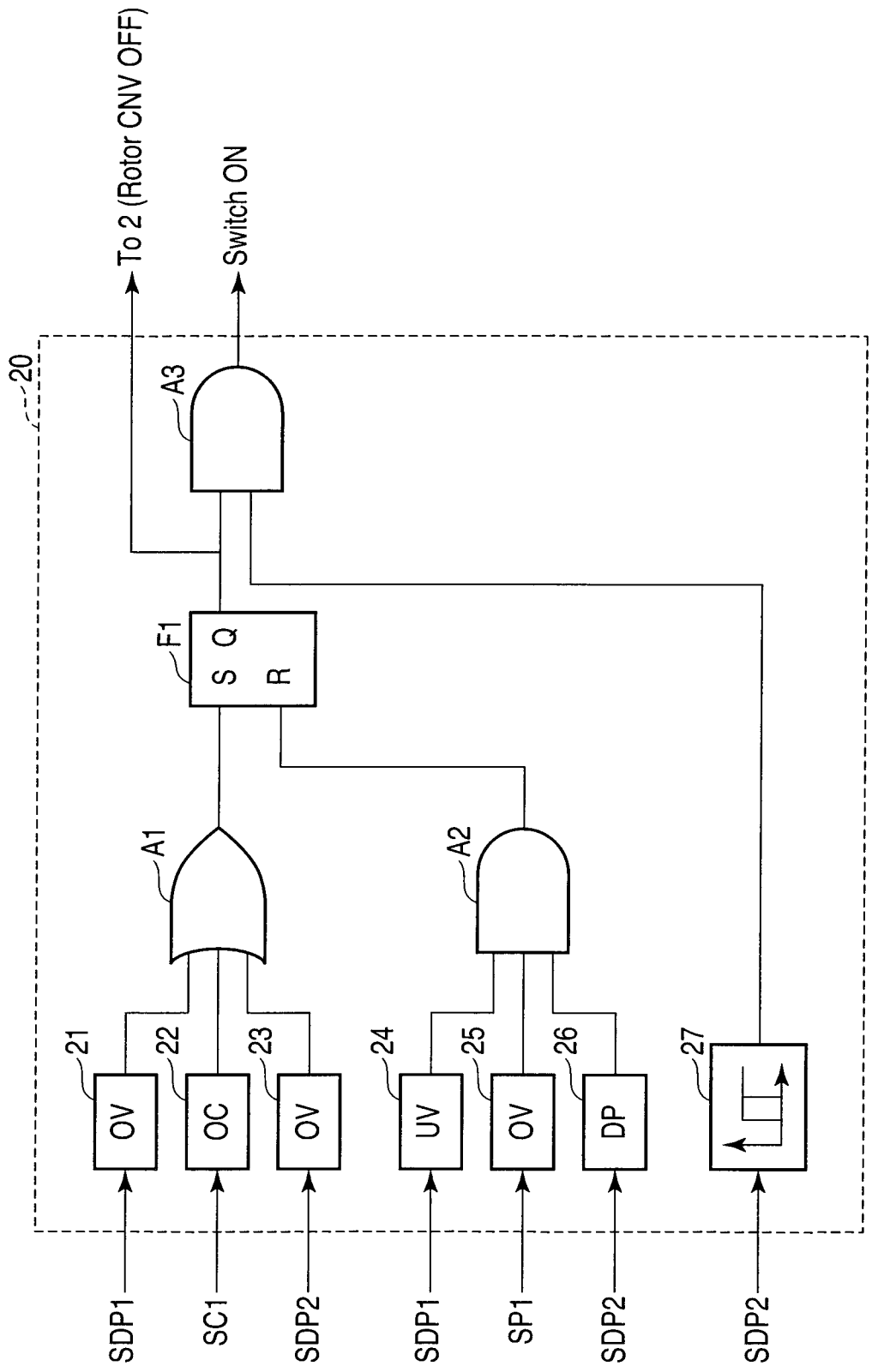
FIG. 3 is a logical circuit diagram showing a control method by a control device according to the first embodiment.

FIG. 3 is a logical circuit diagram showing a control method by the control device 20 according to the present embodiment.

A logical circuit showing the control method by the control device 20 has a configuration including overvoltage detectors 21, 23 and 25, an overcurrent detector 22, an undervoltage detector 24, a consumed power detector 26, a hysteresis comparator 27, an OR circuit A1, AND circuits A2 and A3, and a flip-flop F1.

Into the overvoltage detector 21, there is input the direct-current voltage signal SDP1 indicating the voltage of the direct-current link detected by the direct-current voltage detector DP1. When the direct-current voltage signal SDP1 has a predetermined or higher voltage which becomes the overvoltage, the overvoltage detector 21 switches the signal to "1" and outputs the signal to the OR circuit A1. When the direct-current voltage signal SDP1 is lower than the predetermined voltage, the overvoltage detector 21 switches the signal to "0" and outputs the signal to the OR circuit A1.

Into the overcurrent detector 22, there is input the alternating current signal SC1 indicating the current which is detected by the alternating current detector C1 and flows into the BTB converter 30. When the alternating current signal SC1 has a predetermined or larger current which becomes the overcurrent, the overcurrent detector 22 switches the signal to "1" and outputs the signal to the OR circuit A1. When the alternating current signal SC1 is smaller than the predetermined current, the overcurrent detector 22 switches the signal to "0" and outputs the signal to the OR circuit A1.

Into the overvoltage detector 23, there is input the direct-current voltage signal SDP2 indicating the direct-current voltage of the protection circuit 10 detected by the direct-current voltage detector DP2. When the direct-current voltage signal SDP2 has a predetermined or higher voltage which becomes the overvoltage, the overvoltage detector 23 switches the signal to "1" and outputs the signal to the OR circuit A1. When the direct-current voltage signal SDP2 is lower than the predetermined voltage, the overvoltage detector 23 switches the signal to "0" and outputs the signal to the OR circuit A1.

When one of the signals input from the overvoltage detector 21, the overcurrent detector 22 and the overvoltage detector 23 is "1", the OR circuit A1 switches the signal to "1" and outputs the signal to a set input of the flip-flop F1. That is, the flip-flop F1 is set. The output "1" of the signal by the OR circuit A1 means that the fault of the grid 5 (the voltage drop of the grid 5) has occurred. It is to be noted that although not shown in FIG. 3, when outputting the signal "1", the OR circuit A1 outputs 1 pulse which turns on the switching element 16 for a predetermined time without passing the flip-flop F1.

Into the undervoltage detector 24, there is input the direct-current voltage signal SDP1 indicating the voltage of the direct-current link detected by the direct-current voltage detector DP1. When the direct-current voltage signal SDP1 has a predetermined or lower voltage in which the overvoltage is deemed to be eliminated, the undervoltage detector 24 switches the signal to "1" and outputs the signal to the AND circuit A2. When the direct-current voltage signal SDP1 is higher than the predetermined voltage, the undervoltage detector 24 switches the signal to "0" and outputs the signal to the AND circuit A2.

Into the overvoltage detector 25, there is input the alternating-current voltage signal SP1 indicating the voltage of the grid 5 detected by the alternating-current voltage detector P1. When the alternating-current voltage signal SP1 has the predetermined or higher voltage in which the voltage drop of the grid 5 is deemed to be eliminated, the overvoltage detector 25 switches the signal to "1" and outputs the signal to the AND circuit A2. When the alternating-current voltage signal SP1 is lower than the predetermined voltage, the overvoltage detector 25 switches the signal to "0" and outputs the signal to the AND circuit A2.

Into the consumed power detector 26, there is input the direct-current voltage signal SDP2 indicating the direct-current voltage of the protection circuit 10 detected by the direct-current voltage detector DP2. The consumed power detector 26 calculates an amount of a consumed power on the basis of the direct-current voltage signal SDP2. The amount of the consumed power is calculated by multiplying the direct-current voltage applied to the protection circuit 10 (the resistor 15), a resistance value of the resistor 15, and an on-time of the switching element 16 (a power consumption time by the resistor 15). When the amount of the consumed power is a predetermined value or less, the consumed power detector 26 switches the signal to "1" and outputs the signal to the AND circuit A2. When the amount of the consumed power exceeds the predetermined value, the consumed power detector 26 switches the signal to "0" and outputs the signal to the AND circuit A2.

When the signals input from the undervoltage detector 24, the overvoltage detector 25 and the consumed power detector 26 are all "1", the AND circuit A2 switches the signal to "1" and outputs the signal to a reset input of the flip-flop F1. That is, the flip-flop F1 is reset. The output "1" of the signal by the AND circuit A2 means that the fault of the grid 5 (the voltage drop of the grid 5) has been eliminated (the output "1" by the undervoltage detector 24 and the overvoltage detector 25) and the amount of the power to be consumed by the protection circuit 10 has decreased (the output "1" by the consumed power detector 26).

When set by the OR circuit A1, the flip-flop F1 outputs "1" to the AND circuit A3. Moreover, when set by the OR circuit A1, the flip-flop F1 outputs a signal to stop the rotor-side converter 2.

When reset by the AND circuit A2, the flip-flop F1 outputs "0" to the AND circuit A3. However, when the flip-flop F1 is set (when the output of the OR circuit A1 is "1"), the flip-flop is not reset. That is, the flip-flop F1 is a set-oriented circuit.

To the hysteresis comparator 27, threshold values are set. The threshold values are divided into an upper limit value and a lower limit value. Into the hysteresis comparator 27, there is input the direct-current voltage signal SDP2 indicating the direct-current voltage of the protection circuit 10 detected by the direct-current voltage detector DP2. When the direct-current voltage signal SDP2 exceeds the upper limit value, the hysteresis comparator 27 switches the signal from "0" to "1" and outputs the signal to the AND circuit A3. When the direct-current voltage signal SDP2 is below the lower limit value, the hysteresis comparator 27 switches the signal from "1" to "0" and outputs the signal to the AND circuit A3.

When signals input from the flip-flop F1 and the hysteresis comparator 27 are both "1", the AND circuit A3 turns on the switching element 16. When one of the input signals is "0", the AND circuit A3 turns off the switching element 16.

According to the present embodiment, the current flowing into the rotor-side converter 2 can be consumed by the configuration of the switching element 16 and the resistor 15. Therefore, the protection circuit 10 can be miniaturized.

Moreover, since the switching element 16 is switched to consume the electric power, the control device 20 can repeatedly perform a consuming operation of the electric power by the protection circuit 10 and the stopping of the consuming operation. In consequence, even if the grid fault occurs, the wind power generation system 1 can continue the operation.

Second Embodiment

FIG. 4 is a block diagram showing a configuration of a protection circuit 10A according to a second embodiment of the present invention.

The protection circuit 10A has a configuration in which a capacitor 17 is added to the protection circuit 10 according to the first embodiment. In the other respects, the protection circuit 10A is similar to the protection circuit 10.

The capacitor 17 smooths a direct-current power rectified by a diode rectifier 13.

According to the present embodiment, in addition to the function/effect of the first embodiment, the following function/effect can be obtained.

Since the capacitor 17 is provided, the direct-current power rectified by the diode rectifier 13 is smoothed, so that it is possible to stabilize a direct-current voltage detected by direct-current voltage detection SDP2 (a voltage between both ends of the capacitor 17). Moreover, it is possible to stabilize a current flowing through a switching element 16.

Therefore, owing to a control device 20, the protection circuit 10A can perform a more stable protecting operation than the protection circuit 10 according to the first embodiment.

Third Embodiment

FIG. 5 is a block diagram showing a configuration of a protection circuit 10B according to a third embodiment of the present invention.

The protection circuit 10B has a configuration in which a thyristor 14 and a diode 18 are added to the protection circuit 10A according to the second embodiment. In the other respects, the protection circuit 10B is similar to the protection circuit 10A.

The thyristor 14 is an element which short-circuits a direct-current voltage rectified by a diode rectifier 13 of the protection circuit 10B.

The diode 18 is provided so that when the thyristor 14 is turned on, a current from a capacitor 17 is prevented from flowing into the thyristor 14. In consequence, a capacity of the thyristor 14 can be minimized. That is, the capacity of the thyristor 14 may be not less than a capacity which can only cope with the current flowing from a double-fed induction generator 6.

The thyristor 14 is operated by a control device 20. The control device 20 turns on the thyristor 14 in response to a voltage between both ends of a capacitor 4 (a direct-current voltage detected by a direct-current voltage detector DP1) or a voltage between both ends of the capacitor 17 (the direct-current voltage detected by a direct-current voltage detector DP2) abnormally rising.

According to the present embodiment, it is possible to obtain the function/effect of the second embodiment. Furthermore, since a protecting function due to the thyristor 14 is provided in the protection circuit 10B, a BTB converter 30 (a rotor-side converter 2) can more securely be protected.

It is to be noted that in the respective embodiments, as a condition for turning on the switching element 16, the overvoltage of the direct-current link (detected by the overvoltage detector 21), the overcurrent flowing into the BTB converter 30 (detected by the overcurrent detector 22) and the overvoltage of the direct-current voltage of the protection circuit 10 (detected by the overvoltage detector 23) are detected to obtain a logical add of these values, but this is not restrictive. The condition for turning on the switching element 16 may be another configuration, as long as it indicates the occurrence of the fault of the grid 5 (or the voltage drop of the grid 5). For example, the switching element 16 may be turned on by outputting a logical product of two or more of the conditions input into the OR circuit A1.

Similarly, the condition for turning off the switching element 16 may be a configuration which is different from them in the embodiments, as long as it indicates the recovery of the grid 5 from the fault (or the recovery of the voltage of the grid 5). For example, the switching element 16 may be turned off by at least one or a logical product of a combination of two or more of the undervoltage of the direct-current link voltage (detected by the undervoltage detector 24), the recovery of the voltage of the grid 5 (detected by the overvoltage detector 25) and power consumption having a predetermined or smaller value (detected by the consumption power detector 26).

In each embodiment, the condition for bringing the switching element 16 into an on-state (an input of the AND circuit A3) is a configuration in which the direct-current voltage of the protection circuit 10 is controlled via the hysteresis comparator 27, but in place of the hysteresis comparator, a usual comparator may be used.

The control of the control device 20 in each embodiment (the control shown in FIG. 3) may be constituted of software, hardware, or a combination of them.

It is to be noted that the present invention is not limited to the above embodiments as they are, and in an implementing stage, constituent elements can be modified and embodied without departing from the scope of the present invention. Moreover, an appropriate combination of a plurality of constituent elements described in the above embodiments can form various inventions. For example, several constituent elements may be deleted from all the constituent elements described in the embodiments. Furthermore, the constituent elements of the different embodiments may appropriately be combined.

INDUSTRIAL APPLICABILITY

According to the present invention, it is possible to provide a protection circuit which is applied to a wind power generation system employing a double-fed induction generator, which enables the wind power generation system to acquire LVRT, and which is miniaturized.

What is claimed is:

1. A protection circuit that protects a power converter connected to a secondary winding of a double-fed induction generator, the protection circuit comprising:
   a rectifying unit connected to the secondary winding and configured to rectify an electric power coming through the secondary winding;
   a power consumption unit configured to consume the electric power rectified by the rectifying unit;
   a switching unit connected to the power consumption unit in series and configured to switch to adjust the electric power flowing into the power consumption unit;
   a short-circuit unit configured to short circuit a rectified voltage output by the rectifying unit; and
   a diode coupled to prevent current, not from the rectifying unit, from flowing into the short-circuit unit.

2. The protection circuit according to claim 1, further comprising:
   a capacitor configured to smooth the electric power flowing into the power consumption unit.

3. A wind power generation system comprising:
   a double-fed induction generator;
   a rotor-side converter connected to a secondary winding of the double-fed induction generator;
   a grid-side converter whose direct-current side is connected to a direct-current side of the rotor-side converter via a direct-current link and whose alternating-current side is for connecting to a grid;
   a protection circuit connected to the secondary winding and configured to protect the rotor-side converter; and
   a controller configured to control the protection circuit based on detecting at least a voltage of the grid;
   wherein the protection circuit includes:
      a rectifying unit configured to rectify an electric power coming through the secondary winding;
      a power consumption unit configured to consume the electric power rectified by the rectifying unit; and
      a switching unit connected to the power consumption unit in series and configured to switch to adjust the electric power flowing into the power consumption unit.

4. The wind power generation system according to claim 3, wherein the protection circuit includes a capacitor configured to smooth the electric power flowing into the power consumption unit.

5. The wind power generation system according to claim 3, wherein the protection circuit includes a short-circuit unit configured to short-circuit a voltage rectified by the rectifying unit.

6. The wind power generation system according to claim 3, wherein the controller allows the protection circuit to perform a protecting operation in response to a fault of the grid occurring.

7. The wind power generation system according to claim 3, further comprising:
   an overcurrent detector configured to detect an overcurrent of a current flowing through the rotor-side converter;
   wherein the controller operates the switching unit in response to the overcurrent being detected by the overcurrent detector.

8. The wind power generation system according to claim 3, further comprising:
   a direct-current link voltage overvoltage detector configured to detect an overvoltage of a voltage of the direct-current link,
   wherein the controller operates the switching unit in response to the overvoltage being detected by the direct-current link voltage overvoltage detector.

9. The wind power generation system according to claim 3, further comprising:
   a protection circuit overvoltage detector configured to detect an overvoltage of a voltage rectified by the rectifying unit,
   wherein the controller operates the switching unit in response to the overvoltage being detected by the protection circuit overvoltage detector.

10. The wind power generation system according to claim 3, further comprising:
   a protection circuit voltage detector configured to detect a voltage rectified by the rectifying unit,
   wherein the controller includes a comparator which turns on the switching unit in response to the voltage detected by the protection circuit voltage detector exceeding a threshold value and which turns off the switching unit in response to the voltage detected by the protection circuit voltage detector not exceeding a threshold value.

11. The wind power generation system according to claim 10, wherein the comparator is a hysteresis comparator.

12. The wind power generation system according to claim 3, further comprising:
a direct-current link voltage overvoltage detector configured to detect an overvoltage of a voltage of the direct-current link,
wherein the controller stops the switching unit in response to the overvoltage by the direct-current link voltage overvoltage detector recovering.

13. The wind power generation system according to claim 3, further comprising:
an undervoltage detector configured to detect an undervoltage of a voltage of the grid,
wherein the controller stops the switching unit in response to undervoltage by the undervoltage detector recovering.

14. The wind power generation system according to claim 3, further comprising:
a consumption power amount measurement unit configured to measure an amount of the electric power consumed by the power consumption unit,
wherein the controller stops the switching unit in response to the amount of the electric power measured by the consumption power amount measurement unit not exceeding a predetermined value.

15. The wind power generation system according to claim 4, wherein the protection circuit includes a short-circuit unit configured to short-circuit a voltage rectified by the rectifying unit.

16. The wind power generation system according to claim 4, wherein the controller allows the protection circuit to perform a protecting operation in response to a fault of the grid occurring.

17. The wind power generation system according to claim 4, further comprising:
an overcurrent detector configured to detect an overcurrent of a current flowing through the rotor-side converter,
wherein the controller operates the switching unit in response to the overcurrent being detected by the overcurrent detector.

18. The wind power generation system according to claim 4, further comprising:
a direct-current link voltage overvoltage detector configured to detect an overvoltage of a voltage of the direct-current link,
wherein the controller operates the switching unit in response to the overvoltage being detected by the direct-current link voltage overvoltage detector.

19. The wind power generation system according to claim 4, further comprising:
a protection circuit overvoltage detector configured to detect an overvoltage of a voltage rectified by the rectifying unit,
wherein the controller operates the switching unit in response to the overvoltage being detected by the protection circuit overvoltage detector.

20. The wind power generation system according to claim 4, further comprising:
a protection circuit voltage detector configured to detect a voltage rectified by the rectifying unit,
wherein the controller includes a comparator which turns on the switching unit in response to the voltage detected by the protection circuit voltage detector exceeding a threshold value and which turns off the switching unit in response to the voltage detected by the protection circuit voltage detector not exceeding a threshold value.

21. The wind power generation system according to claim 20, wherein the comparator is a hysteresis comparator.

22. The wind power generation system according to claim 4, further comprising:
a direct-current link voltage overvoltage detector configured to detect an overvoltage of a voltage of the direct-current link,
wherein the controller stops the switching unit in response to the overvoltage by the direct-current link voltage overvoltage detector recovering.

23. The wind power generation system according to claim 4, further comprising:
an undervoltage detector configured to detect an undervoltage of a voltage of the grid,
wherein the controller stops the switching unit in response to the undervoltage by the undervoltage detector recovering.

24. The wind power generation system according to claim 4, further comprising:
a consumption power amount measurement unit configured to measure an amount of the electric power consumed by the power consumption unit,
wherein the controller stops the switching unit in response to the amount of the electric power measured by the consumption power amount measurement unit not exceeding a predetermined value.

25. The wind power generation system according to claim 5, wherein the controller allows the protection circuit to perform a protecting operation in response to a fault of the grid occurring.

26. The wind power generation system according to claim 5, further comprising:
an overcurrent detector configured to detect an overcurrent of a current flowing through the rotor-side converter,
wherein the controller operates the switching unit in response to overcurrent being detected by the overcurrent detector.

27. The wind power generation system according to claim 5, further comprising:
a direct-current link voltage overvoltage detector configured to detect an overvoltage of a voltage of the direct-current link,
wherein the controller operates the switching unit in response to the overvoltage being detected by the direct-current link voltage overvoltage detector.

28. The wind power generation system according to claim 5, further comprising:
a protection circuit overvoltage detector configured to detect an overvoltage of a voltage rectified by the rectifying unit,
wherein the controller operates the switching unit in response to the overvoltage being detected by the protection circuit overvoltage detector.

29. The wind power generation system according to claim 5, further comprising:
a protection circuit voltage detector configured to detect a voltage rectified by the rectifying unit,
wherein the controller includes a comparator which turns on the switching unit in response to the voltage detected by the protection circuit voltage detector exceeding a threshold value and which turns off the switching unit in response to the voltage detected by the protection circuit voltage detector not exceeding a threshold value.

30. The wind power generation system according to claim 29, wherein the comparator is a hysteresis comparator.

31. The wind power generation system according to claim 5, further comprising:

a direct-current link voltage overvoltage detector configured to detect an overvoltage of a voltage of the direct-current link, wherein the controller stops the switching unit in response to the overvoltage by the direct-current link voltage overvoltage detector recovering.

32. The wind power generation system according to claim 5, further comprising:

an undervoltage detector configured to detect an undervoltage of a voltage of the grid, wherein the controller stops the switching unit in response to the undervoltage by the undervoltage detector recovering.

33. The wind power generation system according to claim 5, further comprising:

a consumption power amount measurement unit configured to measure an amount of the electric power consumed by the power consumption unit, wherein the controller stops the switching unit in response to the amount of the electric power measured by the consumption power amount measurement unit not exceeding a predetermined value.

\* \* \* \* \*